United States Patent
Zhou

(10) Patent No.: US 11,310,650 B2
(45) Date of Patent: Apr. 19, 2022

(54) TERMINAL POLICY SENDING METHOD, APPARATUS, AND TERMINAL POLICY SENDING SYSTEM

(71) Applicant: HUAWEI TECHNOLOGIES CO., LTD., Guangdong (CN)

(72) Inventor: Xiaoyun Zhou, Nanjing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/014,581

(22) Filed: Sep. 8, 2020

(65) Prior Publication Data

US 2020/0404478 A1 Dec. 24, 2020

Related U.S. Application Data

(63) Continuation of application No. PCT/CN2020/074375, filed on Feb. 6, 2020.

(30) Foreign Application Priority Data

Feb. 15, 2019 (CN) .......................... 201910118034.3
Feb. 21, 2019 (CN) .......................... 201910130295.7

(51) Int. Cl.
*H04W 8/14* (2009.01)
*H04W 8/00* (2009.01)
*H04W 84/04* (2009.01)

(52) U.S. Cl.
CPC ............. *H04W 8/005* (2013.01); *H04W 8/14* (2013.01); *H04W 84/042* (2013.01)

(58) Field of Classification Search
CPC .......... H04W 8/005; H04W 8/14; H04W 8/02
See application file for complete search history.

(56) References Cited

U.S. PATENT DOCUMENTS

2014/0105129 A1 4/2014 Chen
2014/0254367 A1 9/2014 Jeong et al.
(Continued)

FOREIGN PATENT DOCUMENTS

CN 101043699 A 9/2007
CN 101369909 A 2/2009
(Continued)

OTHER PUBLICATIONS

3GPP TS 29.525 V15.0.0 (Dec. 2018), "3rd Generation Partnership Project; Technical Specification Group Core Network and Terminals; 5G System; UE Policy Control Service;Stage 3 (Release 15)," Dec. 2018, 37 pages.
(Continued)

*Primary Examiner* — Barry W Taylor
(74) *Attorney, Agent, or Firm* — Fish & Richardson P.C.

(57) ABSTRACT

This application provides a terminal policy sending method, an apparatus, and a terminal policy sending system, to help determine an execution result of a first terminal policy. The method performed by a visited policy control function network element includes: receiving a first message from a home policy control function network element, where the first message includes a first terminal policy; sending the first terminal policy and a first procedure transaction identity (PTI) to a mobility management network element; receiving an execution result of the first terminal policy and the first PTI from the mobility management network element; determining, based on the first PTI, whether the execution result is the execution result of the first terminal policy; and sending a second message to the home policy control function network element if the execution result is the execution result of the first terminal policy, where the second message includes the execution result.

21 Claims, 6 Drawing Sheets

(56) References Cited

U.S. PATENT DOCUMENTS

| | | | |
|---|---|---|---|
| 2018/0270840 A1 | 9/2018 | Griot et al. | |
| 2018/0367998 A1 | 12/2018 | Kunz et al. | |
| 2020/0015311 A1* | 1/2020 | Kim | H04W 68/005 |
| 2020/0213876 A1* | 7/2020 | Sun | H04M 15/856 |
| 2021/0153002 A1* | 5/2021 | Zhou | H04W 8/08 |

FOREIGN PATENT DOCUMENTS

| | | |
|---|---|---|
| CN | 104853332 A | 8/2015 |
| CN | 108769976 A | 11/2018 |
| CN | 109219111 A | 1/2019 |
| CN | 109246769 A | 1/2019 |
| CN | 109315004 A | 2/2019 |
| EP | 3145249 A1 | 3/2017 |
| WO | 2018174021 A1 | 9/2018 |

OTHER PUBLICATIONS

3GPP TS 24.501 V15.2.1 (Jan. 2019), "3rd Generation Partnership Project; Technical Specification Group Core Network and Terminals; Non-Access-Stratum (NAS) protocol for 5G System (5GS); Stage 3 (Release 15)," Jan. 2019, 455 pages.

3GPP TS 23.502 V15.4.1 (Jan. 2019), "3rd Generation Partnership Project; Technical Specification Group Services and System Aspects; Procedures for the 5G System; Stage 2 (Release 15)," Jan. 2019, 347 pages.

PCT International Search Report and Written Opinion issued in International Application No. PCT/CN2020/074375 dated May 8, 2020, 10 pages (partial English translation).

Samsung, "Discussion: UE policy delivery for roaming scenario," 3GPP TSG SA WG2 Meeting #128bis, S2-187868, Sophia Antipolis, France, Aug. 20-24, 2018, 5 pages.

Office Action issued in Chinese Application No. 201910130295.7 dated Jan. 6, 2021, 5 pages.

MediaTek Inc., "Correction on PTI mismatch," 3GPP TSG-CT WG1 Meeting #112, C1-185335, West Palm Beach, FL (USA), Aug. 20-24, 2018, 5 pages.

Office Action issued in Chinese Application No. 201910130295.7 dated Aug. 9, 2021, 11 pages.

3GPP TS 23.502 draft V16.0.0+ (Feb. 2019), "3rd Generation Partnership Project; Technical Specification Group Services and System Aspects; Procedures for the 5G System; Stage 2 (Release 16)," Feb. 2019, 378 pages.

Qualcomm Incorporated, "Contents of UE policy container and processing of UE policy sections," 3GPP TSG CT WG1 Meeting #111, C1-183186, Osaka, Japan, May 21-25, 2018, 4 pages.

Samsung, "SBI friendly UE policy delivery procedure," 3GPP TSG SA WG2 Meeting #127, S2-185007, Sanya, China, Apr. 16-20, 2018, 3 pages.

Qualcomm Incorporated, "Discussion on the handling of PSI and UE Policies," SA WG2 Meeting #S2-127BIS, S2-185215, Newport Beach, California, USA, May 28-Jun. 1, 2018, 3 pages.

Extended European Search Report issued in European Application No. 20756610.0 dated May 21, 2021, 15 pages.

* cited by examiner

TERMINAL POLICY SENDING METHOD, APPARATUS, AND TERMINAL POLICY SENDING SYSTEM

CROSS-REFERENCE TO RELATED APPLICATIONS

This application is a continuation of International Patent Application No. PCT/CN2020/074375, filed on Feb. 6, 2020, which claims priority to Chinese Patent Application No. 201910118034.3, filed on Feb. 15, 2019 and Chinese Patent Application No. 201910130295.7, filed on Feb. 21, 2019. The disclosures of the aforementioned applications are hereby incorporated by reference in their entireties.

TECHNICAL FIELD

This application relates to the communications field, and more specifically, to a terminal policy sending method, an apparatus, and a terminal policy sending system.

BACKGROUND

In a 5G system, an access and mobility management function (AMF) may interact with a policy control function (PCF) to obtain a user equipment (UE) policy. The PCF provides the UE policy for a terminal via the AMF. The PCF includes a visited policy control function (V-PCF) or a home policy control function (H-PCF). When the terminal returns an execution result of the UE policy, the AMF may send the execution result of the UE policy to the V-PCF. However, the V-PCF cannot determine whether the execution result is an execution result of a UE policy provided by the V-PCF or an execution result of a UE policy provided by the H-PCF. Therefore, a manner needs to be urgently provided, to enable the V-PCF to determine an execution result of a UE policy.

SUMMARY

In view of this, this application provides a terminal policy sending method, an apparatus, and a terminal policy sending system, to help a visited policy control function network element accurately determine an execution result of a terminal policy.

According to a first aspect, a terminal policy sending method is provided, including: receiving, by a visited policy control function network element, a first message from a home policy control function network element, where the first message includes a first terminal policy; sending, by the visited policy control function network element, the first terminal policy and a first procedure transaction identity PTI to a mobility management network element; receiving, by the visited policy control function network element, an execution result of the first terminal policy and the first PTI from the mobility management network element; determining, by the visited policy control function network element based on the first PTI, whether the execution result is the execution result of the first terminal policy; and sending, by the visited policy control function network element, a second message to the home policy control function network element if the execution result is the execution result of the first terminal policy, where the second message includes the execution result. In this way, the execution result is accurately determined.

In a possible implementation, the first message further includes the first PTI, and the first PTI is selected by the home policy control function network element from a preset PTI value range. Therefore, a manner of determining the first PTI is relatively flexible, and the first PTI may be determined by the home policy control function network element.

Optionally, the first PTI may be a PTI allocated by the home policy control function network element for the first terminal policy. If the visited policy control function network element determines that the first PTI is the PTI allocated by the home policy control function network element, the visited policy control function network element determines that the execution result is the execution result of the first terminal policy, and therefore can send the execution result to the home policy control function network element.

Optionally, before the visited policy control function network element receives the first message from the home policy control function network element, the visited policy control function network element may further send the preset PTI value range to the home policy control function network element. Because the preset PTI value range is determined by the visited policy control function network element, after receiving the execution result and the first PTI from the mobility management network element, the visited policy control function network element only needs to determine whether the first PTI falls within the preset PTI value range. If the first PTI falls within the preset PTI value range, it is considered that the execution result is the execution result of the first terminal policy provided by the home policy control function network element.

In another possible implementation, after the visited policy control function network element receives the first message from the home policy control function network element, the method further includes: sending, by the visited policy control function network element to the home policy control function network element, the first PTI allocated by the visited policy control function network element for the first terminal policy. Therefore, a manner of determining the first PTI is relatively flexible, and the first PTI may be determined by the visited policy control function network element. In this way, whether the execution result is the execution result of the first terminal policy provided by the home policy control function network element can be directly determined.

Optionally, the first PTI may be a PTI allocated by the visited policy control function network element for the first terminal policy. If the visited policy control function network element determines that the first PTI is the PTI allocated by the visited policy control function network element for the first terminal policy, the visited policy control function network element determines that the execution result is the execution result of the first terminal policy. Optionally, the visited policy control function network element may allocate the PTI for the first terminal policy in a plurality of cases, and one of the cases may be that the first PTI is allocated to replace the PTI allocated by the home policy control function network element.

Optionally, the second message further includes the first PTI.

In another possible implementation, the first message further includes a second PTI, and the second PTI is a PTI allocated by the home policy control function network element for the first terminal policy; and before the visited policy control function network element sends the first terminal policy and the first procedure transaction identity PTI to the mobility management network element, the visited policy control function network element allocates the first PTI for the first terminal policy.

Optionally, a specific implementation of allocating, by the visited policy control function network element, the first PTI for the first terminal policy may be: if the visited policy control function unit has used the second PTI, allocating, by the visited policy control function network element, the first PTI for the first terminal policy. Herein, if the second PTI allocated by the home policy control function network element has been used, the visited policy control function unit may reallocate a PTI (namely, the first PTI), to avoid a conflict. In this way, the execution result is determined more accurately.

Optionally, the visited policy control function sends both a second terminal policy formulated by the visited policy control function and the first terminal policy to the mobility management network element.

Optionally, the first PTI may be a PTI allocated by the visited policy control function network element for the first terminal policy. If the visited policy control function network element determines that the first PTI is the PTI allocated by the visited policy control function network element for the first terminal policy, the visited policy control function network element determines that the execution result is the execution result of the first terminal policy. Optionally, the second message further includes the second PTI. Herein, the second message may include the first PTI and the second PTI, or may include the second PTI but does not include the first PTI.

In a case in which the second message includes the second PTI but does not include the first PTI, before sending the second message to the home policy control function network element, the visited policy control function network element replaces the first PTI received from the mobility management network element with the second PTI. Correspondingly, the visited policy control function network element sends, to the home policy control function network element, the second message that carries the second PTI and the execution result. In this way, the home policy control function network element can determine, based on the second PTI, that the execution result is the execution result, provided by the home policy control function network element, of the first terminal policy.

Optionally, when the visited policy control function network element sends the first terminal policy and the first procedure transaction identity PTI to the mobility management network element, the visited policy control function network element further sends, to the mobility management network element, the second terminal policy formulated by the visited policy control function network element. In this case, if the visited policy control function network element receives a manage terminal policy complete message sent by the mobility management network element, the execution result is an execution success result of the first terminal policy; or if the visited policy control function network element receives a manage terminal policy command reject message sent by the mobility management network element, and the manage terminal policy command reject message includes an execution failure result of the first terminal policy, the execution result is the execution failure result of the first terminal policy; or if the visited policy control function network element receives a manage terminal policy command reject message sent by the mobility management network element, and the manage terminal policy command reject message does not include an execution failure result of the first terminal policy, the execution result is an execution success result of the first terminal policy.

Herein, if the visited policy control function network element not only sends, to the mobility management network element, the first terminal policy of the home policy control function network element, but also sends the second terminal policy formulated by the visited policy control function network element, a result returned by the mobility management network element may include results of the two policies. Specifically, for example, if the mobility management network element sends a manage terminal policy complete message, it indicates that both the two policies are successfully executed. If the mobility management network element sends a manage terminal policy command reject message, it indicates that at least one of the two policies fails to be executed. In this case, the second terminal policy may fail to be executed, or the first terminal policy of the home policy control function network element may fail to be executed, or both the policies fail to be executed. This may specifically depend on an execution failure result of a policy included in the manage terminal policy command reject message. For example, if the manage terminal policy command reject message includes the execution failure result of the first terminal policy, it indicates that the first terminal policy of the home policy control function network element fails to be executed; or if the manage terminal policy command reject message does not include the execution failure result of the first terminal policy, it indicates that the first terminal policy of the home policy control function network element is successfully executed. Similarly, if the manage terminal policy command reject message includes an execution failure result of the second terminal policy, it indicates that the second terminal policy of the visited policy control function network element fails to be executed; or if the manage terminal policy command reject message does not include an execution failure result of the second terminal policy, it indicates that the second terminal policy of the visited policy control function network element is successfully executed.

In another possible implementation, the first message further includes the first PTI, and the sending, by the visited policy control function network element, the first terminal policy and a first procedure transaction identity PTI to a mobility management network element specifically includes: if the visited policy control function network element has not used the first PTI, sending, by the visited policy control function network element, the first terminal policy and the first PTI to the mobility management network element. The first PTI is allocated by the home policy control function network element. Further, if the visited policy control function network element determines that the first PTI allocated by the home policy control function network element has not been used, the visited policy control function network element determines that the execution result is the execution result of the first terminal policy, and the visited policy control function network element sends the first terminal policy and the first PTI to the mobility management network element.

Optionally, when the visited policy control function network element sends the first terminal policy and the first procedure transaction identity PTI to the mobility management network element, the visited policy control function network element further sends, to the mobility management network element, a second terminal policy formulated by the visited policy control function network element. In this case, if the visited policy control function network element receives a manage terminal policy complete message sent by the mobility management network element, the execution result is an execution success result of the first terminal policy; or if the visited policy control function network element receives a manage terminal policy command reject message sent by the mobility management network element, and the manage terminal policy command reject message includes an execution failure result of the first terminal policy, the execution result is the execution failure result of the first terminal policy; or if the visited policy control function network element receives a manage terminal policy command reject message sent by the mobility management network element, and the manage terminal policy command reject message does not include an execution failure result of the first terminal policy, the execution result is an execution success result of the first terminal policy.

According to a second aspect, a terminal policy sending method is provided, including: sending, by a home policy control function network element, a first message to a visited policy control function network element, where the first message includes a first terminal policy; sending, by the visited policy control function network element, the first terminal policy and a first procedure transaction identity PTI to a mobility management network element; receiving, by the visited policy control function network element, an execution result of the first terminal policy and the first PTI from the mobility management network element; determining, by the visited policy control function network element based on the first PTI, that the execution result is the execution result of the first terminal policy; and sending, by the visited policy control function network element, a second message to the home policy control function network element, where the second message includes the execution result. In this way, the execution result is accurately determined.

In a possible implementation, the first message further includes the first PTI, and the first PTI is selected by the home policy control function network element from a preset PTI value range. Therefore, a manner of determining the first PTI is relatively flexible, and the first PTI may be determined by the home policy control function network element.

In another possible implementation, after the visited policy control function network element receives the first message from the home policy control function network element, the visited policy control function network element sends, to the home policy control function network element, the first PTI allocated by the visited policy control function network element for the first terminal policy. Therefore, a manner of determining the first PTI is relatively flexible, and the first PTI may be determined by the visited policy control function network element. In this way, whether the execution result is the execution result of the first terminal policy provided by the home policy control function network element can be determined.

According to a third aspect, a terminal policy sending system is provided, including: a home policy control function network element, configured to send a first message to a visited policy control function network element, where the first message includes a first terminal policy; and the visited policy control function network element, configured to: send the first terminal policy and a first procedure transaction identity PTI to a mobility management network element; receive an execution result of the first terminal policy and the first PTI from the mobility management network element; determine, on the first PTI, whether the execution result is the execution result of the first terminal policy; and send a second message to the home policy control function network element if the execution result is the execution result of the first terminal policy. In this way, the execution result is accurately determined.

In a possible implementation, the first message further includes the first PTI, and the first PTI is selected by the home policy control function network element from a preset PTI value range. Therefore, a manner of determining the first PTI is relatively flexible, and the first PTI may be determined by the home policy control function network element.

In another possible implementation, after the visited policy control function network element receives the first message from the home policy control function network element, the visited policy control function network element is further configured to send, to the home policy control function network element, the first PTI allocated by the visited policy control function network element for the first terminal policy. Therefore, a manner of determining the first PTI is relatively flexible, and the first PTI may be determined by the visited policy control function network element. In this way, whether the execution result is the execution result of the first terminal policy provided by the home policy control function network element can be determined.

According to a fourth aspect, a communications apparatus is provided. The apparatus may be a policy control function network element (which may have both a visited policy control function and a home policy control function), or may be a chip. The apparatus has a function of implementing the visited policy control function network element and a function of implementing the home policy control function network element in any aspect or any possible implementation of any aspect. The function may be implemented by hardware, or may be implemented by hardware executing corresponding software. The hardware or the software includes one or more modules corresponding to the function.

According to a fifth aspect, a communications apparatus is provided. The apparatus may be a visited policy control function network element, or may be a chip. The apparatus has a function of implementing the visited policy control function network element in any aspect or any possible implementation of any aspect. The function may be implemented by hardware, or may be implemented by hardware executing corresponding software. The hardware or the software includes one or more modules corresponding to the function.

According to a sixth aspect, a communications apparatus is provided. The apparatus may be a home policy control function network element, or may be a chip. The apparatus has a function of implementing the home policy control function network element in any aspect or any possible implementation of any aspect. The function may be implemented by hardware, or may be implemented by hardware executing corresponding software. The hardware or the software includes one or more modules corresponding to the function.

According to a seventh aspect, an apparatus is provided. The apparatus includes a processor, a memory, and a transceiver. The processor is connected to the memory and the transceiver. The memory is configured to store an instruction. The processor is configured to execute the instruction. The transceiver is configured to communicate with another network element under control of the processor. When the processor executes the instruction stored in the memory, the execution enables the apparatus to perform the method of the visited policy control function network element in any one of the foregoing aspects or the possible implementations of the foregoing aspects, or perform the method of the home policy control function network element in any aspect or any possible implementation of any aspect. It should be noted that the memory may be integrated into the processor, or may be independent of the processor.

According to an eighth aspect, an apparatus is provided. The apparatus includes a processor and a transceiver. The processor is connected to the transceiver. The processor is configured to execute an instruction. The transceiver is configured to communicate with another network element under control of the processor. When the processor executes the instruction, the execution enables the apparatus to perform the method of the visited policy control function network element in any one of the foregoing aspects or the possible implementations of the foregoing aspects, or perform the method of the home policy control function network element in any aspect or any possible implementation of any aspect.

According to a ninth aspect, a computer-readable storage medium is provided. The computer-readable storage medium stores a program, and the program enables a visited policy control function network element to perform the method of the visited policy control function network element in any one of the foregoing aspects or the possible implementations of the foregoing aspects.

According to a tenth aspect, a computer-readable storage medium is provided. The computer-readable storage medium stores a program, and the program enables a home policy control function network element to perform the method of the home policy control function network element in any one of the foregoing aspects or the possible implementations of the foregoing aspects.

According to an eleventh aspect, a communications chip is provided. The communications chip stores an instruction. When the instruction is run on a computer device, the communications chip is enabled to perform the method in any one of the foregoing aspects or the possible implementations of the foregoing aspects.

According to a twelfth aspect, a computer program product including an instruction is provided. When the computer program product runs on a computer, the computer is enabled to perform the method in any one of the foregoing aspects or the possible implementations of the foregoing aspects.

DESCRIPTION OF EMBODIMENTS

The following describes the technical solutions of this application with reference to the accompanying drawings.

The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, a future 5th generation (5G) system, or a new radio (NR) system.

Figure 1:
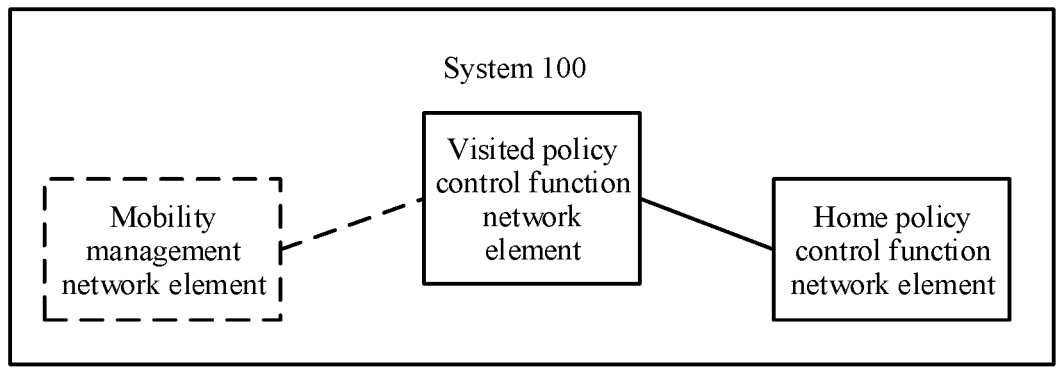
FIG. 1 is a schematic diagram of a system architecture applicable to embodiments of this application.

FIG. 1 is a schematic diagram of a system architecture applicable to embodiments of this application. As shown in FIG. 1, the system 100 includes a visited policy control function network element and a home policy control function network element. The system 100 may be configured to perform a terminal policy sending method in the embodiments of this application. Optionally, the system 100 further includes a mobility management network element.

The home policy control function network element is configured to send a first message to the visited policy control function network element, where the first message includes a first terminal policy. The visited policy control function network element is configured to: send the first terminal policy and a first procedure transaction identity (PTI) to the mobility management network element; receive an execution result of the first terminal policy and the first PTI from the mobility management network element; determine, based on the first PTI, that the execution result is the execution result of the first terminal policy; and send a second message to the home policy control function network element, where the second message includes the execution result.

In a possible implementation, the first message further includes the first PTI, and the first PTI is selected by the home policy control function network element from a preset PTI value range.

In another possible implementation, after the visited policy control function network element receives the first message from the home policy control function network element, the visited policy control function network element is further configured to send, to the home policy control function network element, the first PTI allocated by the visited policy control function network element for the first terminal policy.

It should be noted that the visited policy control function network element, the home policy control function network element, the mobility management network element, and the like in FIG. 1 are merely names, and the names constitute no limitation on the devices. In a 5G network and another future network, the visited policy control function network element, the home policy control function network element, and the mobility management network element may also have other names. This is not specifically limited in the embodiments of this application. For example, the visited policy control function network element may alternatively be replaced by a visited policy control function (V-PCF) entity, the home policy control function network element may alternatively be replaced by a home policy control function (H-PCF) entity, and the mobility management network element may alternatively be replaced by an access and mobility management function (AMF) entity. A general description is provided herein, and details are not described below.

Optionally, the visited policy control function network element, the home policy control function network element, and the access and mobility management network element in the system 100 each may be an independent network element, or may be jointly implemented by a plurality of network elements, or may be used as a functional module in one network element. This is not specifically limited in the embodiments of this application.

It may be understood that the foregoing functions may be network elements in a hardware device, or may be software functions running on dedicated hardware, or may be virtual functions instantiated on a platform (for example, a cloud platform).

A terminal in the embodiments of this application may be referred to as user equipment (UE), an access terminal, a terminal in V2X communication, a subscriber unit, a subscriber station, a mobile station, a mobile console, a remote station, a remote terminal, a mobile device, a user terminal, a terminal device, a wireless communications device, a user agent, a user apparatus, or the like. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application. The terminal may alternatively include a V2X device, for example, a vehicle or an on board unit (OBU) in a vehicle.

The terminal in the embodiments of this application is connected to a radio access network (RAN) device in a wireless manner. The radio access network device is connected to a core network device in a wireless or wired manner. The core network device and the radio access network device may be different physical devices independent of each other, or a function of the core network device and a logical function of the radio access network device may be integrated into one physical device, or a part of a function of the core network device and a part of a function of the radio access network device may be integrated into one physical device. The terminal may be located at a fixed location, or may be mobile.

The radio access network device is an access device through which the UE is connected to the mobile communications system in a wireless manner. The radio access network device may be a NodeB, an evolved NodeB eNodeB, a gNodeB (gNB) in a 5G mobile communications system, a base station in a future mobile communications system, an access node in a wireless fidelity (WiFi) system, or the like. The radio access network device may alternatively be a radio controller in a cloud radio access network (CRAN) scenario. Alternatively, the access network device may be a relay station, an access point, a vehicle-mounted device, a wearable device, a network device in a future 5G network, a network device in a future evolved PLMN network, or the like. A specific technology and a specific device form that are to be used for the radio access network device are not limited in the embodiments of this application.

For example, the core network device includes a mobility management entity (MME) or a broadcast multicast service center (BMSC), or may include a corresponding function entity in a 5G system, for example, a core network control plane (CP) or user plane (UP) network function such as a session management network function (SMF) or an access and mobility management function AMF. The core network control plane may also be understood as a core network control plane function (CPF) entity.

Optionally, the system 100 shown in FIG. 1 may be applied to a 5G network and another possible future network. This is not specifically limited in the embodiments of this application.

Figure 2:
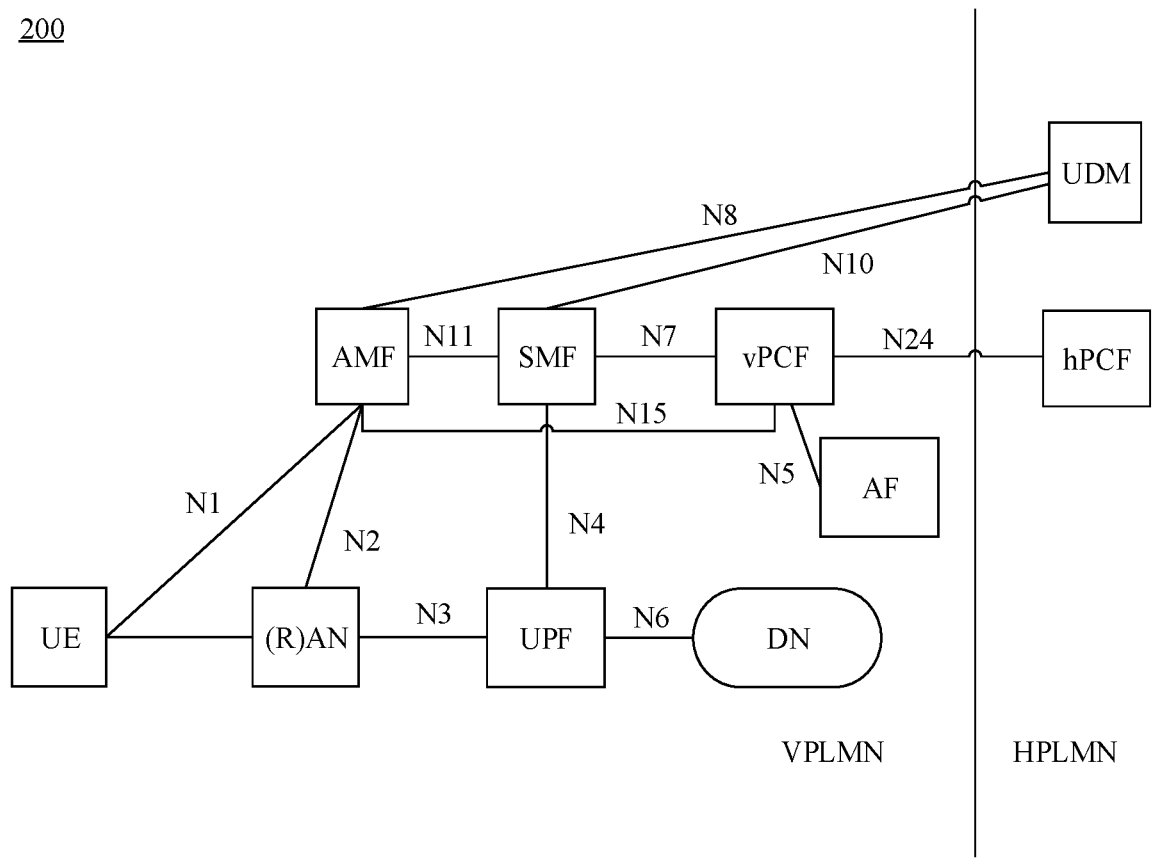
FIG. 2 is a diagram of a local roaming architecture applicable to embodiments of this application.
Figure 3:
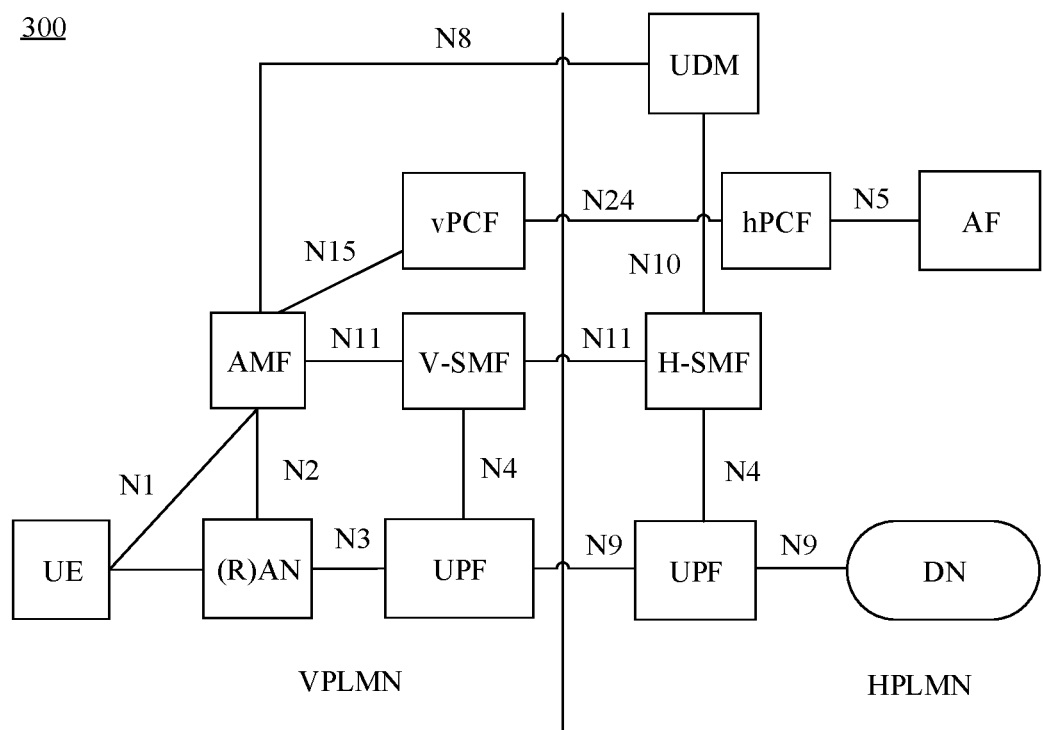
FIG. 3 is a diagram of a home-routed roaming architecture applicable to embodiments of this application.

The system 100 shown in FIG. 1 is applied to a 5G network. As shown in FIG. 2 or FIG. 3, for example, the visited policy control function network element may be a V-PCF in 5G, the home policy control function network element may be an H-PCF in 5G, and the access and mobility management network element may be an AMF in 5G.

FIG. 2 is a diagram of a local roaming architecture applicable to embodiments of this application. As shown in FIG. 2, a system 200 includes an access and mobility management function AMF, a session management function (SMF) device, a radio access network (RAN), a unified data management (UDM) device, a policy control function (PCF) device, a data network (DN), a user plane function (UPF) device, user equipment UE, and an application function (AF). The UE is connected to the AMF through an N1 interface, and the UE is connected to the RAN by using a radio resource control (RRC) protocol. The RAN is connected to the AMF through an N2 interface, and the RAN is connected to the UPF through an N3 interface. The UPF is connected to the DN through an N6 interface, and the UPF is connected to the SMF through an N4 interface. The SMF is connected to a V-PCF through an N7 interface, the SMF is connected to the UDM through an N10 interface, and the SMF is connected to the AMF through an N11 interface. The AMF is connected to the UDM through an N8 interface, and the AMF is connected to the V-PCF through an N15 interface. The AMF and the SMF obtain subscription data from the UDM through the N8 interface and the N10 interface, respectively, and obtain policy data from the V-PCF through the N15 interface and the N7 interface, respectively. The AF is connected to the V-PCF through an N5 interface. The SMF controls the UPF through the N4 interface. The V-PCF is connected to an H-PCF through an N-24 interface.

FIG. 3 is a diagram of a home-routed roaming architecture applicable to embodiments of this application. As shown in FIG. 3, a difference between FIG. 3 and FIG. 2 is as follows: A UPF and a home session management function (H-SMF) are added on a home public land mobile network (H-PLMN) side in a system 300. In other words, both a visited public land mobile network (V-PLMN) side and the H-PLMN side include a UPF and an SMF. The UPF on the V-PLMN side is connected to the UPF on the H-PLMN side through an N9 interface, and the UPF on the H-PLMN side is connected to a DN through the N9 interface. A V-SMF on the V-PLMN side is connected to the H-SMF on the H-PLMN side through an N11 interface. The H-SMF is connected to the UPF on the H-PLMN side through an N4 interface, and the H-SMF is connected to a UDM through an N10 interface. An H-PCF is connected to an AF through an N5 interface.

It should be noted that names of the network elements (such as the V-PCF, the H-PCF, and the AMF) included in FIG. 2 or FIG. 3 are merely names, and the names constitute no limitation on functions of the network elements. In a 5G network and another future network, the foregoing network elements may also have other names. This is not specifically limited in the embodiments of this application. For example, in a 6G network, some or all of the foregoing network elements may still use terms in 5G, or may have other names. A general description is provided herein, and details are not described below.

For specific working processes and beneficial effects of the network elements in the systems in FIG. 1 to FIG. 3, refer to descriptions in the following method embodiments.

Figure 4:
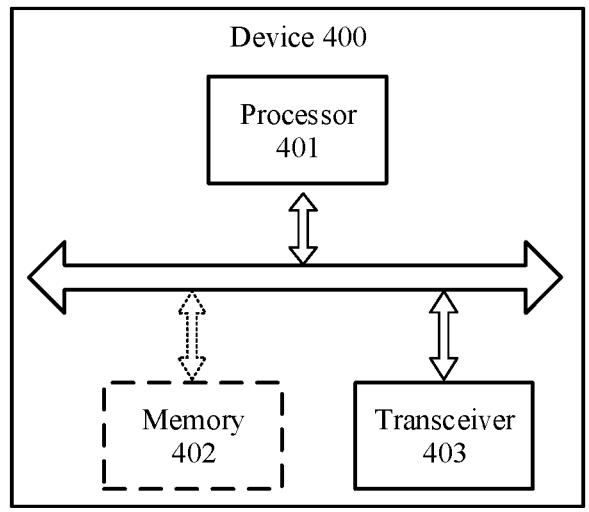
FIG. 4 is a schematic block diagram of a computer device applicable to embodiments of this application.

FIG. 4 is a schematic block diagram of a computer device 400 (or a terminal policy sending apparatus) applicable to embodiments of this application. The visited policy control function network element and the home policy control function network element in FIG. 1 may be implemented in a form of the computer device in FIG. 4. Alternatively, the V-PCF and the H-PCF in FIG. 2 or the V-PCF and the H-PCF in FIG. 3 may be implemented in a form of the computer device in FIG. 4.

As shown in FIG. 4, the computer device includes a processor 401 and a transceiver 403. Optionally, the computer device may further include a memory 402. A specific deployment location of the memory 402 is not specifically limited in this embodiment of this application. The memory may be integrated into the processor, or may be independent of the processor. In a case in which the computer device does not include a memory, the computer device only needs to have a processing function, and the memory may be deployed at another location (for example, a cloud system).

The processor 401, the memory 402, and the transceiver 403 communicate with each other through an internal connection path, to transfer a control signal and/or a data signal.

It may be understood that, although not shown, the computer device 400 may further include another apparatus, such as an input apparatus, an output apparatus, or a battery.

Optionally, in some embodiments, the memory 402 may store an executable instruction used to perform a method in the embodiments of this application. The processor 401 may execute the instruction stored in the memory 402, to complete, in combination with other hardware (for example, the transceiver 403), steps to be performed in the following methods. For a specific working process and beneficial effect, refer to descriptions in the following method embodiments.

The methods disclosed in the embodiments of this application may be applied to a processor or may be implemented by a processor. The processor may be an integrated circuit chip and has a signal processing capability. In an implementation process, steps in the method can be implemented by using a hardware integrated logical circuit in the processor, or by using an instruction in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and implemented by a hardware decoding processor, or may be performed and implemented by a combination of hardware and software modules in a decoding processor. A software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads an instruction in the memory and performs the steps in the foregoing methods in combination with hardware of the processor.

The computer device 400 may be a general-purpose computer device or a special-purpose computer device. In a specific implementation, the computer device 400 may be a desktop computer, a portable computer, a network server, a personal digital assistant (PDA), a mobile phone, a tablet computer, a wireless terminal device, a communications device, an embedded device, or a device having a structure similar to that in FIG. 3. A type of the computer device 400 is not limited in the embodiments of this application.

Figure 5:
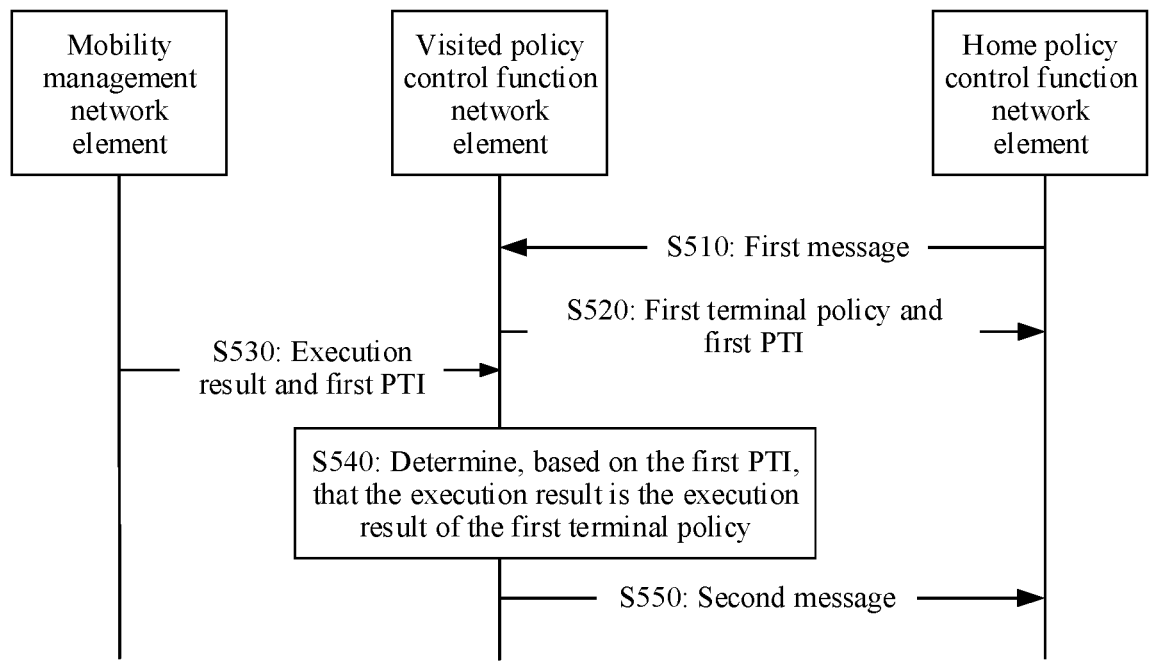
FIG. 5 is a schematic flowchart of a terminal policy sending method according to an embodiment of this application.

FIG. 5 is a schematic flowchart of a terminal policy sending method 500 according to an embodiment of this application. It should be understood that receiving and sending in an interaction procedure in FIG. 5 may be performed by using a message in an existing standard. For a specific meaning of the message, refer to a description in the standard. Alternatively, receiving and sending may be performed by using a newly defined message. This is not limited in this application. As shown in FIG. 5, the method 500 includes the following steps.

S510: A home policy control function network element sends a first message to a visited policy control function network element, where the first message includes a first terminal policy. Correspondingly, the visited policy control function network element receives the first message from the home policy control function network element.

A terminal policy (which may also be referred to as a UE policy) (including the first terminal policy and a second terminal policy to be mentioned below) in the embodiments of this application may also be referred to as a UE access selection and PDU session selection related policy (UE access selection and PDU session selection related policy). The terminal policy may include an access network discovery and selection policy (ANDSP) or a UE route selection policy (URSP). The ANDSP is used for UE to select a non-3GPP access network. The URSP is used for the UE to determine how to route data, that is, determine a PDU session to be used to send data or determine to offload data from a non-3GPP access network. The terminal policy may be a to-be-updated terminal policy, or may be a newly formulated terminal policy. This is not limited in this application.

The first message may be an Npcf_UEPolicyControl_UpdateNotify request in an existing protocol.

In this embodiment of this application, the first message may carry a first PTI, or the visited policy control function network element may allocate a first PTI for the first terminal policy. This is not specifically limited herein.

A final objective of sending, by the home policy control function network element, the first message to the visited policy control function network element is to provide the first terminal policy for a terminal. The home policy control function network element may provide the first terminal policy for the terminal according to one or more of the following cases:

(1) During initial registration of the terminal, the home policy control function network element interacts with an H-UDR, to obtain a first terminal policy that is previously formulated by a home location (H-PLMN may be referred to as the home location for short) for the terminal. The first terminal policy includes a UE policy section identifier (UPSI) list and content corresponding to the UE policy section identifier list. If the terminal provides a UPSI list formulated by the home H-PLMN, the home policy control function network element compares the UPSI list provided by the terminal with the UPSI list obtained from the H-UDR. If the home policy control function network element determines that the UPSI list and the content corresponding to the UPSI list need to be updated, the home policy control function network element updates the previously formulated first terminal policy, and sends an updated first terminal policy (that is, a UPSI and content corresponding to the UPSI). If the home policy control function network element does not receive a UPSI list formulated by the H-PLMN, the home policy control function network element formulates a first UE Policy.

(2) After the initial registration of the terminal, if a location of the terminal changes, the home policy control function network element needs to update the previously formulated first terminal policy.

(3) After the initial registration of the terminal, if a subscription of the terminal changes, the home policy control function network element updates the previously formulated first terminal policy.

(4) After the initial registration of the terminal, if an operator policy changes, the home policy control function network element updates the previously formulated first terminal policy.

It should be understood that the foregoing four cases in which the first terminal policy is provided are merely examples for description, and constitute no limitation on the embodiments of this application.

Optionally, the home policy control function network element may further start a timer, and provide the first terminal policy for the terminal based on the timer. Specifically, if the timer expires, and the home policy control function network element does not receive a response message from the terminal, the home policy control function network element re-sends the first message.

S520: The visited policy control function network element sends the first terminal policy and a first procedure transaction identity PTI to a mobility management network element.

Optionally, the visited policy control function network element may send the first terminal policy and the first procedure transaction identity PTI to the mobility management network element by using a manage UE policy command (MANAGE UE POLICY COMMAND) message.

A format of the manage UE policy command may be shown in Table 1:

TABLE 1

| Information element | Type/Reference | Presence | Format | Length |
|---|---|---|---|---|
| PTI | Procedure transaction identity | M | V | 1 |
| Manage UE policy command message identity | UE policy delivery service message type | M | V | 1 |
| UE policy section management list | UE policy section management list | M | LV-E | 3-65538 |

For specific explanations of content in Table 1, refer to descriptions in the existing standard protocol (3GPP TS 24.501 D.5.1.1). Details are not described herein.

Further, the visited policy control function network element may send the manage UE policy command message to the mobility management network element by using an Namf_Commmuncation_N1N2MessageTransfer request message in the protocol.

The visited policy control function network element may send both the first terminal policy and the first PTI to the mobility management network element, so that the mobility management network element sends the first terminal policy and the first PTI to the terminal. The mobility management network element may send the first terminal policy and the first PTI to the terminal by using a manage UE policy command message. The terminal stores the received first terminal policy and executes the first terminal policy, and then sends an execution result of the first terminal policy to the mobility management network element. The UE may send the execution result and the first PTI to the mobility management network element by using different message formats. If a message format 1 is used, it indicates that the first terminal policy is successfully executed. If a message format 2 is used, it indicates that the first terminal policy fails to be executed.

For example, the message format 1 may be a manage UE policy complete message format shown in Table 2.

TABLE 2

| Information element | Type/Reference | Presence | Format | Length |
|---|---|---|---|---|
| PTI | Procedure transaction identity | M | V | 1 |
| Manage UE policy complete message identity | UE policy delivery service message type | M | V | 1 |

For specific explanations of content in Table 2, refer to descriptions in the existing standard protocol (3GPP TS 24.501 D.5.1.2). Details are not described herein.

For example, the message format 2 may be a manage UE policy command reject message format shown in Table 3.

TABLE 3

| Information element | Type/Reference | Presence | Format | Length |
|---|---|---|---|---|
| PTI | Procedure transaction identity | M | V | 1 |
| Manage UE policy command reject message identity | UE policy delivery service message type | M | V | 1 |
| UE policy section management result | UE policy section management result | M | LV-E | 3-65538 |

For specific explanations of content in Table 3, refer to descriptions in the existing standard protocol (3GPP TS 24.501 D.5.1.3). Details are not described herein.

After receiving the execution result and the first PTI that are returned by the UE, the mobility management network element may send the execution result and the first PTI to the visited policy control function network element.

S530: The mobility management network element sends the execution result and the first PTI to the visited policy control function network element. Correspondingly, the visited policy control function network element receives the execution result and the first PTI from the mobility management network element.

Optionally, the mobility management network element may send the execution result and the first PTI to the visited policy control function network element by using an Namf_N1MessageNotify message in the protocol.

S540: The visited policy control function network element determines, based on the first PTI, that the execution result is the execution result of the first terminal policy.

The visited policy control function network element determines, based on the first PTI, whether the execution result is the execution result of the first terminal policy provided by the home policy control function network element. If the mobility management network element provides the first PTI when providing the execution result, the visited policy control function network element considers that the execution result is the execution result of the first terminal policy provided by the home policy control function network element.

S550: The visited policy control function network element sends a second message to the home policy control function network element, where the second message includes the execution result. Correspondingly, the home policy control function network element receives the second message.

Optionally, if the home policy control function network element starts a timer in S510, and if the home policy control function network element determines that the execution result is the execution result of the first terminal policy in S510, the home policy control function network element stops the timer and performs another subsequent possible operation (for details, refer to a procedure in the standard protocol).

Optionally, the second message may be an Npcf_UEPolicyControl_Update request in the protocol.

In this embodiment of this application, the visited policy control function network element may determine, based on the first PTI, whether the received execution result is the execution result of the first terminal policy provided by the home policy control function network element, and then send the execution result to the home policy control function network element. In this way, the execution result can be accurately determined, and accuracy of forwarding the execution result of the first terminal policy can be improved.

The first PTI in this embodiment of this application may be obtained in different manners, which are to be separately described below.

Implementation 1:

The first PTI is allocated by the home policy control function network element. Specifically, when the home policy control function network element provides the first terminal policy for the visited policy control function network element, the first PTI may be carried in the first message.

The first PTI may be selected by the home policy control function network element from a preset PTI value range. The preset PTI value range may be agreed on according to a roaming agreement, or specified in the standard, or determined by the visited policy control function network element, or dynamically negotiated by the visited policy control function network element and the home policy control function network element.

Optionally, before the visited policy control function network element receives the first message from the home policy control function network element, the method further includes: The visited policy control function network element sends the preset PTI value range (or referred to as a PTI value interval) to the home policy control function network element. To be specific, the visited policy control function network element may determine a PTI value interval, and notify the home policy control function network element of the PTI value interval, so that the home policy control function network element selects the first PTI from the PTI value interval. After the visited policy control function network element receives the execution result and the first PTI, if the visited policy control function network element determines that the first PTI falls within the PTI value interval, the visited policy control function network element considers that the execution result is the execution result of the UE policy provided by the home policy control function network element, and then forwards the execution result to the home policy control function network element by using the second message. The second message further includes the first PTI.

For example, it may be specified in the standard that a PTI value range corresponding to the home policy control function network element is 1 to 127, and a PTI value range corresponding to the visited policy control function network element is 128 to 254.

In conclusion, in Implementation 1, the home policy control function network element may allocate the first PTI for the first terminal policy, so that the visited policy control function network element determines, based on the first PTI, whether the execution result is the execution result of the first terminal policy provided by the home policy control function network element.

Figure 6:
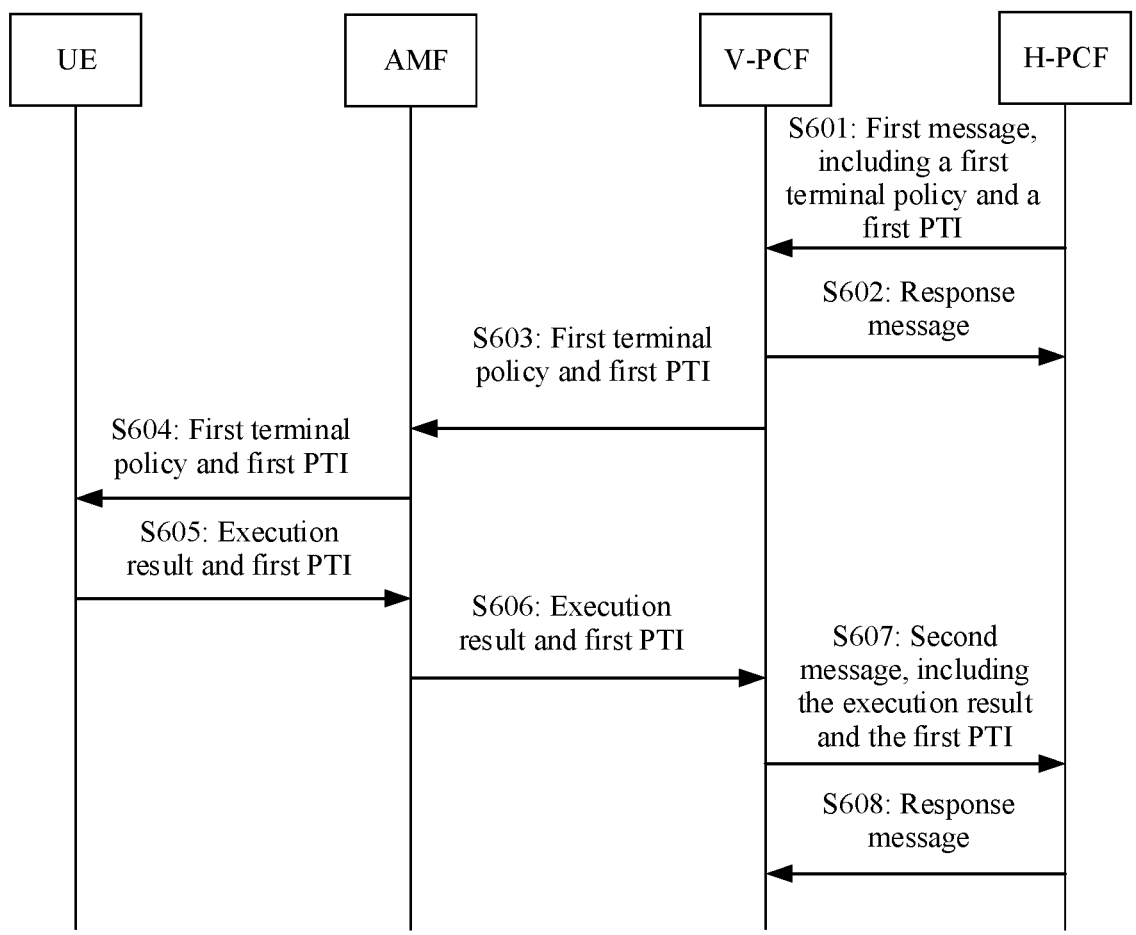
FIG. 6 is a schematic interaction diagram of an example of sending a terminal policy according to an embodiment of this application.

For ease of understanding, the following describes Implementation 1 by using an example in FIG. 6. A general description is provided herein. The following interaction procedure examples are described by using an example in which a visited policy control function network element is a V-PCF, a home policy control function network element is an H-PCF, a mobility management network element is an AMF, and a terminal is UE. As shown in FIG. 6, this example includes the following steps.

S601: The H-PCF sends a first message to the V-PCF, where the first message includes a first terminal policy and a first PTI.

S602: The V-PCF sends a response message to the H-PCF. Optionally, the response message may be an Npcf_UEPolicyControl_UpdateNotify response in the protocol.

S603: The V-PCF sends the first terminal policy and the first PTI to the AMF.

It should be understood that a sequence of performing S602 and S603 is not specifically limited in this embodiment of this application. S602 may be performed before S603, or S602 may be performed after S603, depending on a specific situation.

S604: The AMF sends the first terminal policy and the first PTI to the UE.

S605: The UE sends an execution result and the first PTI to the AMF.

S606: The AMF sends the execution result and the first PTI to the V-PCF.

S607: The V-PCF sends a second message to the H-PCF, where the second message includes the execution result and the first PTI.

S608: The H-PCF sends a response message to the V-PCF, where the response message is used to notify the V-PCF that the execution result is received.

It should be understood that receiving and sending in an interaction procedure in FIG. 6 may be performed by using a message in an existing standard. For a specific meaning of the message, refer to a description in the standard. Alternatively, receiving and sending may be performed by using a newly defined message. This is not limited in this application.

Implementation 2:

The visited policy control function network element allocates the first PTI to the home policy control function network element. Optionally, after the visited policy control function network element receives the first message from the home policy control function network element, the method 500 further includes:

sending, by the visited policy control function network element to the home policy control function network element, the first PTI allocated by the visited policy control function network element for the first terminal policy.

Specifically, after receiving the first terminal policy provided by the home policy control function network element, the visited policy control function network element may send the first PTI to the home policy control function network element by using an Npcf_UEPolicyControl_UpdateNotify response in the protocol. In other words, the visited policy control function network element may alternatively allocate the first PTI to the home policy control function network element. Because the first PTI is allocated by the visited policy control function network element, after receiving the execution result, the visited policy control function network element may directly determine whether the execution result is the execution result of the first terminal policy provided by the home policy control function network element. If the execution result is the execution result of the first terminal policy provided by the home policy control function network element, the visited policy control function network element forwards the execution result to the home policy control function network element by using the second message. The second message further includes the first PTI.

Figure 7:
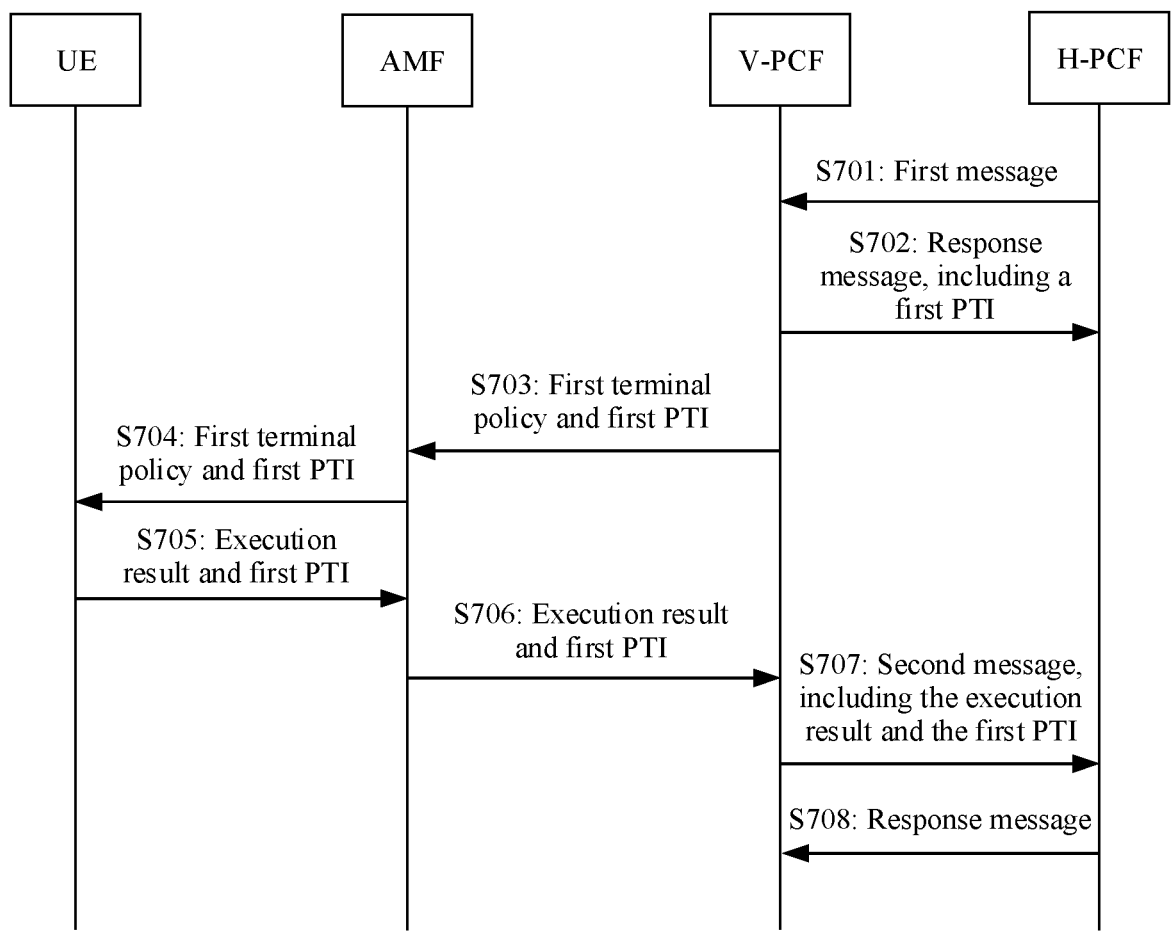
FIG. 7 is a schematic interaction diagram of another example of sending a terminal policy according to an embodiment of this application.

For ease of understanding, the following describes Implementation 2 with reference to an example in FIG. 7. As shown in FIG. 7, this example includes the following steps.

S701: The H-PCF sends a first message to the V-PCF, where the first message includes a first terminal policy.

S702: The V-PCF sends a response message to the H-PCF, where the response message includes a first PTI. The first PTI is allocated by the V-PCF to the H-PCF.

Optionally, the response message may be an Npcf_UEPolicyControl_UpdateNotify response in the protocol.

S703: The V-PCF sends the first terminal policy and the first PTI to the AMF.

It should be understood that a sequence of performing S702 and S703 is not specifically limited in this embodiment of this application. S702 may be performed before S703, or S702 may be performed after S703, depending on a specific situation.

S704: The AMF sends the first terminal policy and the first PTI to the UE.

S705: The UE sends an execution result and the first PTI to the AMF.

S706: The AMF sends the execution result and the first PTI to the V-PCF.

S707: The V-PCF sends a second message to the H-PCF, where the second message includes the execution result and the first PTI.

S708: The H-PCF sends a response message to the V-PCF, where the response message is used to notify the V-PCF that the execution result is received.

It should be understood that receiving and sending in an interaction procedure in FIG. 7 may be performed by using a message in an existing standard. For a specific meaning of the message, refer to a description in the standard. Alternatively, receiving and sending may be performed by using a newly defined message. This is not limited in this application.

Implementation 3:

The first message further includes a second PTI, and the second PTI is a PTI allocated by the home policy control function network element for the first terminal policy. Optionally, before the visited policy control function network element sends the first terminal policy and the first procedure transaction identity PTI to the mobility management network element, the method 500 further includes:

allocating, by the visited policy control function network element, the first PTI for the first terminal policy.

Optionally, a specific implementation of allocating, by the visited policy control function network element, the first PTI for the first terminal policy may be as follows: When the visited policy control function network element determines that the second PTI allocated by the home policy control function network element has been used by the visited policy control function network element, the visited policy control function network element allocates the first PTI for the first terminal policy.

If the visited policy control function unit has not used the second PTI, the first PTI sent by the visited policy control function network element to the mobility management network element is the second PTI (it may be understood that a value of the first PTI is equal to a value of the second PTI).

In Implementation 3, the visited policy control function network element reallocates a PTI, namely, the first PTI, for the first terminal policy, and stores a correspondence between the first PTI and the second PTI. The visited policy control function network element sends the first terminal policy and the first PTI to the mobility management network element, and then receives the execution result and the first PTI that are sent by the mobility management network element. After receiving the execution result sent by the mobility management network element, the visited policy control function network element may send the second message to the home policy control function network element, where the second message includes the execution result.

Optionally, the visited policy control function network element reallocates the PTI, namely, the first PTI, for the first terminal policy only when the visited policy control function network element determines that the second PTI allocated by the home policy control function network element has been used by the visited policy control function network element. If the visited policy control function unit has not used the second PTI, the first PTI sent by the visited policy control function network element to the mobility management network element is the second PTI (it may be understood that the value of the first PTI is equal to the value of the second PTI).

Optionally, the visited policy control function network element may further send, to the mobility management network element, both a second terminal policy formulated by the visited policy control function network element and the first terminal policy sent by the home policy control function network element. After receiving the execution result and the first PTI that are sent by the mobility management network element, the visited policy control function network element sends, to the home policy control function network element, the second PTI and the execution result corresponding to the first terminal policy formulated by the home policy control function network element. Specifically, if the visited policy control function network element receives a manage terminal policy complete (MANAGE UE POLICY COMPLETE) message sent by the mobility management network element, the visited policy control function network element sends the manage UE policy complete message to the home policy control function network element, where the manage terminal policy complete message includes the second PTI, and the execution result is an execution success result of the first terminal policy formulated by the home policy control function network element. Alternatively, if the visited policy control function network element receives a manage terminal policy command reject (MANAGE UE POLICY COMMAND REJECT) message sent by the mobility management network element, and the manage terminal policy command reject message includes an execution failure result of the first terminal policy corresponding to a home policy control function network element, the visited policy control function network element sends the manage UE policy command reject message to the home policy control function network element, where the manage UE terminal command reject message includes the second PTI and the execution failure result of the first terminal policy corresponding to the home policy control function network element, and the execution result is the execution failure result of the first terminal policy. Alternatively, if the visited policy control function network element receives a manage UE policy command reject message sent by the mobility management network element, and the manage UE policy command reject message does not include an execution failure result of the first terminal policy corresponding to the home policy control function network element, the visited policy control function network element sends a manage UE policy complete message to the home policy control function network element, where the manage UE policy complete message includes the second PTI, and the execution result is an execution success result of the first terminal policy. Optionally, the second message further includes the second PTI. Specifically, in addition to the execution result, the second message includes content in the following case (1) or case (2): In the case (1), the first PTI and the second PTI. In the case (2), only the second PTI for sending.

For the case (2), the method 500 further includes:

before the sending, by the visited policy control function network element, a second message to the home policy control function network element, replacing, by the visited policy control function network element, the first PTI received from the mobility management network element with the second PTI; and correspondingly, the sending, by the visited policy control function network element, a second message to the home policy control function network element specifically includes: sending, to the home policy control function network element, the second message that carries the second PTI and the execution result.

Specifically, after receiving the execution result and the first PTI that are sent by the mobility management network element, the visited policy control function network element replaces the first PTI with the second PTI before sending the second message to the home policy control function network element. In other words, to enable the home policy control function network element to determine the execution result, the visited policy control function network element may replace the first PTI received from the mobility management network element with the second PTI, and then send the second message including the second PTI and the execution result to the home policy control function network element. Because the second PTI is allocated by the home policy control function network element, the home policy control function network element can determine, based on the second PTI, that the execution result is the execution result of the first terminal policy provided by the home policy control function network element.

Figure 8:
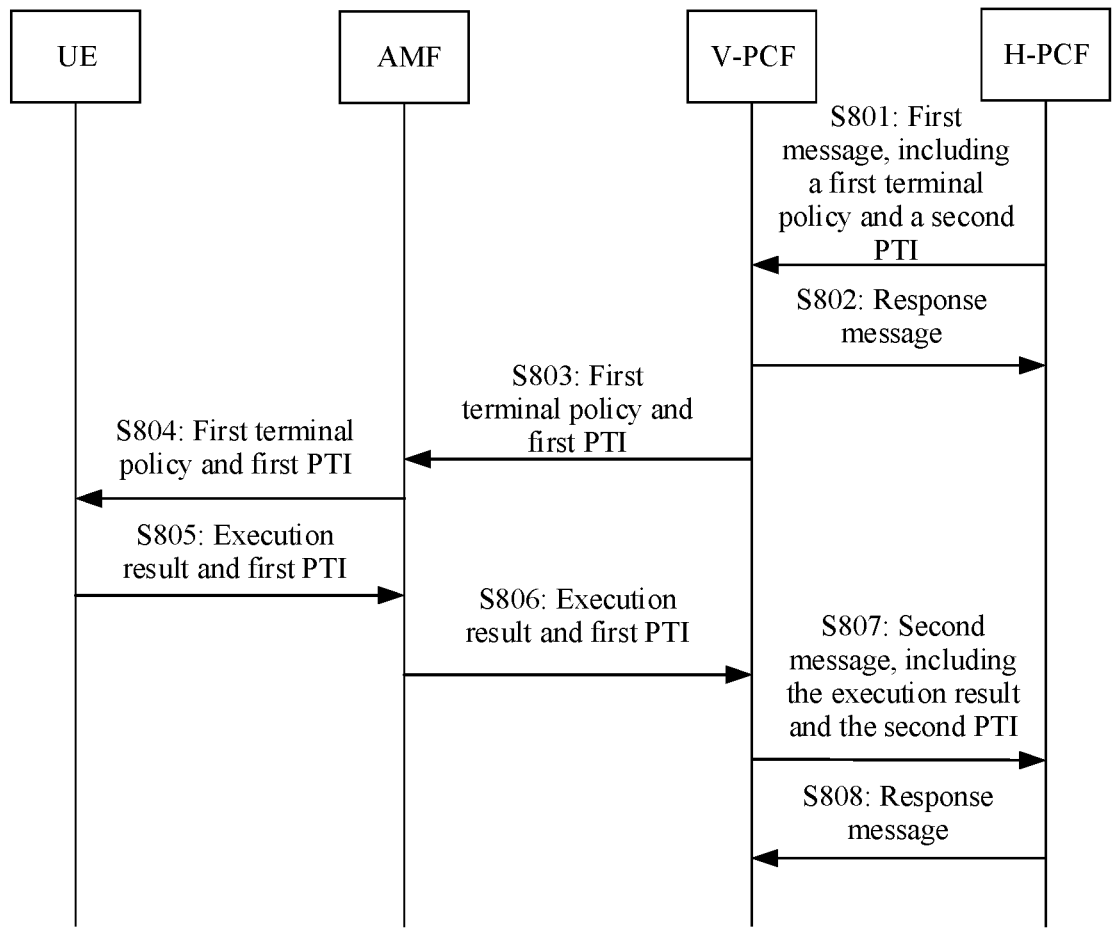
FIG. 8 is a schematic interaction diagram of still another example of sending a terminal policy according to an embodiment of this application.

For ease of understanding, the following describes Implementation 3 by using an example in FIG. 8. As shown in FIG. 8, this example includes the following steps.

S801: The H-PCF sends a first message to the V-PCF, where the first message includes a first terminal policy and a second PTI. The second PTI is allocated by the H-PCF.

S802: The V-PCF sends a response message to the H-PCF.

Optionally, the response message may be an Npcf_UEPolicyControl_UpdateNotify response in the protocol.

S803: The V-PCF sends the first terminal policy and the first PTI to the AMF.

Herein, the V-PCF reallocates the first PTI for the first terminal policy provided by the H-PCF, and stores a correspondence between the first PTI and the second PTI. Optionally, the V-PCF reallocates the first PTI for the first terminal policy provided by the H-PCF only when the V-PCF determines that the second PTI has been used. If the second PTI has not been used, the first PTI sent to the mobility management network element is the second PTI (it may be understood that a value of the first PTI is equal to a value of the second PTI).

Herein, the V-PCF further formulates a second terminal policy of the visited policy control function network element, and sends the second terminal policy to the AMF. To be specific, the V-PCF encapsulates the received first terminal policy formulated by the H-PCF and the second terminal policy formulated by the V-PCF in a manage UE policy command message, where a PTI in the manage UE policy command message is the first PTI.

It should be understood that a sequence of performing S802 and S803 is not specifically limited in this embodiment of this application. S802 may be performed before S803, or S802 may be performed after S803, depending on a specific situation.

S804: The AMF sends, to the UE, the first terminal policy and the first PTI that are provided by the H-PCF.

If the V-PCF further provides the second terminal policy, the AMF further sends, to the UE, the second terminal policy provided by the V-PCF. To be specific, the AMF sends, to the UE, the manage UE policy command message in which the first terminal policy formulated by the H-PCF and the second terminal policy formulated by the V-PCF are encapsulated.

S805: The UE sends an execution result and the first PTI to the AMF.

S806: The AMF sends the execution result and the first PTI to the V-PCF.

S807: The V-PCF sends a second message to the H-PCF, where the second message includes the execution result and the second PTI.

Herein, the V-PCF replaces the first PTI sent by the AMF with the second PTI, and sends, to the H-PCF, the second message that carries the execution result and the second PTI, so that the H-PCF determines the execution result based on the second PTI.

Herein, if the V-PCF further provides the second terminal policy, the V-PCF sends, to the H-PCF, only the execution result corresponding to the first terminal policy provided by the H-PCF. Specifically, the V-PCF determines, based on the foregoing descriptions, the execution result corresponding to the first terminal policy provided by the H-PCF.

S808: The H-PCF sends a response message to the V-PCF, where the response message is used to notify the V-PCF that the execution result is received.

It should be understood that receiving and sending in an interaction procedure in FIG. 8 may be performed by using a message in an existing standard. For a specific meaning of the message, refer to a description in the standard. Alternatively, receiving and sending may be performed by using a newly defined message. This is not limited in this application.

Therefore, in this embodiment of this application, the first PTI may be obtained in any one of the foregoing three implementations. This helps the visited policy control function network element determine the execution result.

It should be understood that the solutions in the embodiments of this application may be combined, and explanations or descriptions of the terms in the embodiments may be cited or explained in the embodiments. This is not limited in this application.

It should also be understood that the examples in FIG. 6 to FIG. 8 are provided merely to help a person skilled in the art understand the embodiments of this application, instead of limiting the embodiments of this application to specific scenarios shown in the examples. A person skilled in the art can definitely make various equivalent modifications or changes according to the examples shown in FIG. 6 to FIG. 8, and such modifications or changes also fall within the scope of the embodiments of this application.

The foregoing describes the terminal policy sending method according to the embodiments of this application. The following describes an apparatus according to the embodiments of this application.

Figure 9:
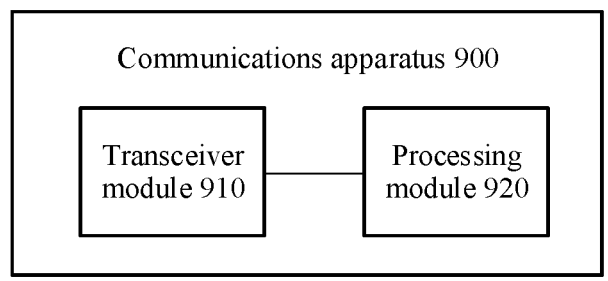
FIG. 9 is a schematic block diagram of a communications apparatus according to an embodiment of this application.

FIG. 9 is a schematic block diagram of a communications apparatus 900 according to an embodiment of this application. Optionally, a specific form of the communications apparatus 900 may be a general-purpose computer device or a chip in a general-purpose computer device. This is not limited in this embodiment of this application. The communications apparatus 900 is a visited policy control function network element, and the communications apparatus 900 includes a transceiver module 910 and a processing module 920.

The transceiver module 910 is configured to: receive a first message from a home policy control function network element, where the first message includes a first terminal policy; send the first terminal policy and a first procedure transaction identity PTI to a mobility management network element; and receive an execution result of the first terminal policy and the first PTI from the mobility management network element.

The processing module 920 is configured to determine, based on the first PTI, that the execution result is the execution result of the first terminal policy.

The transceiver module 910 is further configured to send a second message to the home policy control function network element, where the second message includes the execution result.

In a first implementation, the first message further includes the first PTI, and the first PTI is selected by the home policy control function network element from a preset PTI value range.

Optionally, the processing module 920 is further configured to: before the first message is received from the home policy control function network element, allocate the preset PTI value range to the home policy control function network element. Correspondingly, the transceiver module 910 is further configured to send the preset PTI value range to the home policy control function network element.

Optionally, that the processing module 920 is configured to determine, based on the first PTI, that the execution result is the execution result of the first terminal policy specifically includes: If the processing module 920 determines that the first PTI is a PTI allocated by the home policy control function network element, the processing module 920 determines that the execution result is the execution result of the first terminal policy.

In a second implementation, the processing module 920 is further configured to: after the first message is received from the home policy control function network element, allocate the first PTI for the first terminal policy. Correspondingly, the transceiver module 910 is further configured to send the first PTI to the home policy control function network element.

Optionally, the second message further includes the first PTI.

Optionally, that the processing module 920 is configured to determine, based on the first PTI, that the execution result is the execution result of the first terminal policy specifically includes: If the processing module 920 determines that the first PTI is a PTI allocated by the processing module 920 for the first terminal policy, the processing module 920 determines that the execution result is the execution result of the first terminal policy.

In a third implementation, the first message further includes a second PTI, and the second PTI is a PTI allocated by the home policy control function network element for the first terminal policy. The processing module 920 is further configured to allocate the first PTI for the first terminal policy. Optionally, that the processing module 920 is further configured to allocate the first PTI for the first terminal policy specifically includes: When determining that the visited policy control function unit has used the second PTI, the processing module allocates the first PTI for the first terminal policy.

Optionally, the second message further includes the second PTI.

Optionally, the processing module 920 is further configured to replace the first PTI received from the mobility management network element with the second PTI. Correspondingly, that the transceiver module 910 is configured to send a second message to the home policy control function network element specifically includes: The transceiver module 910 sends, to the home policy control function network element, the second message that carries the second PTI and the execution result.

Optionally, that the processing module 920 is configured to determine, based on the first PTI, that the execution result is the execution result of the first terminal policy specifically includes: If the processing module 920 determines that the first PTI is a PTI allocated by the processing module 920 for the first terminal policy, the processing module 920 determines that the execution result is the execution result of the first terminal policy.

In a fourth implementation, the first message further includes the first PTI, and that the transceiver module 910 is configured to send the first terminal policy and a first procedure transaction identity PTI to a mobility management network element specifically includes: If the processing module 920 has not used the first PTI, the transceiver module 910 sends the first terminal policy and the first PTI to the mobility management network element.

Optionally, that the processing module 920 is configured to determine, based on the first PTI, that the execution result is the execution result of the first terminal policy specifically includes: If the processing module 920 determines that the first PTI allocated by the home policy control function network element has not been used, the processing module 920 determines that the execution result is the execution result of the first terminal policy.

Optionally, the transceiver module 910 is further configured to send, to the mobility management network element, a second terminal policy formulated by the visited policy control function network element. Correspondingly, that the transceiver module 910 is configured to receive an execution result of the first terminal policy from the mobility management network element specifically includes: If the transceiver module 910 receives a manage terminal policy complete message sent by the mobility management network element, the transceiver module 910 sends a manage terminal policy complete message to the home network policy control function network element, where the execution result is an execution success result of the first terminal policy. Alternatively, if the transceiver module 910 receives a manage terminal policy command reject message sent by the mobility management network element, and the manage terminal policy command reject message includes an execution failure result of the first terminal policy, the transceiver module 910 sends a manage terminal policy command reject message to the home network policy control function network element, where the manage terminal policy command reject message includes the execution failure result of the first terminal policy, and the execution result is the execution failure result of the first terminal policy. Alternatively, if the transceiver module 910 receives a manage terminal policy command reject message sent by the mobility management network element, and the manage terminal policy command reject message does not include an execution failure result of the first terminal policy, the transceiver module 910 sends a manage terminal policy complete message to the home network policy control function network element, where the execution result is an execution success result of the first terminal policy.

It should be understood that the communications apparatus 900 in this embodiment of this application may correspond to the visited policy control function network element in the foregoing method embodiment, and the foregoing and other management operations and/or functions of the modules in the communications apparatus 900 are performed to separately implement steps corresponding to the method of the session management network element in the foregoing method embodiment. Therefore, beneficial effects in the foregoing method embodiment can also be achieved. For brevity, details are not described herein again.

It should also be understood that in this embodiment, the communications apparatus 900 is presented in a form of functional modules. The "module" herein may be an application-specific integrated circuit ASIC, a circuit, a processor and a memory that execute one or more software or firmware programs, an integrated logic circuit, and/or another component that can provide the foregoing functions. In a simple embodiment, a person skilled in the art may figure out that the apparatus 900 may be in a form shown in FIG. 4. The processing module 920 may be implemented by the processor 401 shown in FIG. 4. Optionally, if the computer device shown in FIG. 4 includes the memory 402, the processing module 920 may be implemented by the processor 401 and the memory 402, and the transceiver module 910 may be implemented by the transceiver 403 shown in FIG. 4. Specifically, the processor is implemented by executing a computer program stored in the memory. Optionally, when the apparatus 900 is a chip, a function and/or an implementation process of the transceiver module 910 may alternatively be implemented by a pin, a circuit, or the like. Optionally, the memory may be a storage unit on the chip, such as a register or a cache. The storage unit may be a storage unit that is in the computer device and that is located outside the chip, for example, the memory 402 shown in FIG. 4, or may be a storage unit that is deployed in another system or device but not located in the computer device. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but are not limited to a radio channel, and various other media that can store, contain, and/or carry an instruction and/or data.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

It should be further understood that the terms "first", "second", and the like introduced in the embodiments of this application are merely used to distinguish between different objects, for example, distinguish between different messages, and constitute no limitation on this application.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal policy sending method, comprising:
    receiving, by a visited policy control function network element, a first message from a home policy control function network element, wherein the first message comprises a first terminal policy and a second procedure transaction identity (PTI);
    sending, by the visited policy control function network element, the first terminal policy and a first PTI to a mobility management network element, wherein the first PTI is allocated by the visited policy control function network element for the first terminal policy;
    receiving, by the mobility management network element, the first terminal policy and the first PTI;
    sending, by the mobility management network element to the visited policy control function network element, an execution result of the first terminal policy and the first PTI;
    receiving, by the visited policy control function network element, the execution result of the first terminal policy and the first PTI;
    determining, by the visited policy control function network element based on the first PTI, that the execution result is the execution result of the first terminal policy; and
    sending, by the visited policy control function network element, a second message to the home policy control function network element, wherein the second message comprises the execution result and the second PTI.

2. The method according to claim 1, wherein the second PTI is a PTI allocated by the home policy control function network element for the first terminal policy.

3. The method according to claim 1, wherein the sending, by the visited policy control function network element, the first terminal policy and the first PTI to the mobility management network element comprises:
    sending, by the visited policy control function network element to the mobility management network element, the first terminal policy, the first PTI, and a second terminal policy selected by the visited policy control function network element; and
    the method further comprises:
    receiving, by the mobility management network element, the second terminal policy.

4. The method according to claim 1, wherein
    the receiving, by the visited policy control function network element, an execution result of the first terminal policy comprises:
    receiving, by the visited policy control function network element, a manage terminal policy complete message from the mobility management network element, wherein the execution result of the first terminal policy is an execution success result of the first terminal policy.

5. The method according to claim 1, wherein the receiving, by the visited policy control function network element, an execution result of the first terminal policy comprises:
    receiving, by the visited policy control function network element, a manage terminal policy command reject message from the mobility management network element, and the manage terminal policy command reject message comprises an execution failure result of the first terminal policy, wherein the execution result of the first terminal policy is the execution failure result of the first terminal policy.

6. The method according to claim 1, wherein the receiving, by the visited policy control function network element, an execution result of the first terminal policy comprises:
    receiving, by the visited policy control function network element, a manage terminal policy command reject message from the mobility management network element, and the manage terminal policy command reject message does not comprise an execution failure result of the first terminal policy, wherein the execution result of the first terminal policy is an execution success result of the first terminal policy.

7. A terminal policy sending system, comprising:
    a visited policy control function network element configured to:
    receive a first message from a home policy control function network element, wherein the first message comprises a first terminal policy and a second procedure transaction identity (PTI);
    send the first terminal policy and a first PTI to a mobility management network element;

the mobility management network element configured to:
   receive the first terminal policy and the first PTI;
   send, to the visited policy control function network element, an execution result of the first terminal policy and the first PTI; and
wherein the visited policy control function network element is further configured to:
   receive the execution result of the first terminal policy and the first PTI;
   determine, based on the first PTI, that the execution result is the execution result of the first terminal policy; and
   send a second message to the home policy control function network element, wherein the second message comprises the execution result and the second PTI.

8. The terminal policy sending system according to claim 7, wherein the second PTI is a PTI allocated by the home policy control function network element for the first terminal policy.

9. The terminal policy sending system according to claim 8, wherein:
the visited policy control function network element is further configured to:
   send, to the mobility management network element, a second terminal policy selected by the visited policy control function network element together with the first terminal policy and the first PTI; and
the mobility management network element is further configured to receive the second terminal policy.

10. The terminal policy sending system according to claim 7, wherein the visited policy control function network element is configured to
receive a manage terminal policy complete message from the mobility management network element, and wherein the execution result of the first terminal policy is an execution success result of the first terminal policy.

11. The terminal policy sending system according to claim 7, wherein the visited policy control function network element is configured to
receive a manage terminal policy command reject message from the mobility management network element, and the manage terminal policy command reject message comprises an execution failure result of the first terminal policy, wherein the execution result of the first terminal policy is the execution failure result of the first terminal policy.

12. The terminal policy sending system according to claim 7, wherein the visited policy control function network element is configured to
receive a manage terminal policy command reject message from the mobility management network element, and the manage terminal policy command reject message does not comprise an execution failure result of the first terminal policy, wherein the execution result of the first terminal policy is an execution success result of the first terminal policy.

13. A communications apparatus, comprising:
at least one processor; and
a non-transitory computer-readable storage medium coupled to the at least one processor and storing programming instructions for execution by the at least one processor, wherein the programming instructions instruct the at least one processor to:
receive a first message from a home policy control function network element, wherein the first message comprises a first terminal policy and a second procedure transaction identity (PTI);
send the first terminal policy and a first PTI to a mobility management network element;
receive an execution result of the first terminal policy and the first PTI from the mobility management network element;
determine, based on the first PTI, that the execution result is the execution result of the first terminal policy; and
send a second message to the home policy control function network element, wherein the second message comprises the execution result and the second PTI.

14. The apparatus according to claim 13, wherein the second PTI is a PTI allocated by the home policy control function network element for the first terminal policy.

15. The apparatus according to claim 13, wherein the programming instructions instruct the at least one processor to:
send, to the mobility management network element, a second terminal policy selected by the communications apparatus together with the first terminal policy and the first PTI.

16. The apparatus according to claim 13, wherein the programming instructions instruct the at least one processor to:
receive a manage terminal policy complete message from the mobility management network element, wherein the execution result is an execution success result of the first terminal policy; or
receive a manage terminal policy command reject message from the mobility management network element, wherein the manage terminal policy command reject message comprises an execution failure result of the first terminal policy, and the execution result of the first terminal policy is the execution failure result of the first terminal policy; or
receive a manage terminal policy command reject message from the mobility management network element, and the manage terminal policy command reject message does not comprise an execution failure result of the first terminal policy, the execution result of the first terminal policy is an execution success result of the first terminal policy.

17. A terminal policy sending method, comprising:
receiving, by a visited policy control function network element, a first message from a home policy control function network element, wherein the first message comprises a first terminal policy and a second procedure transaction identity (PTI);
sending, by the visited policy control function network element, the first terminal policy and a first PTI to a mobility management network element, wherein the first PTI is allocated by the visited policy control function network element for the first terminal policy;
receiving, by the visited policy control function network element, an execution result of the first terminal policy and the first PTI from the mobility management network element;
determining, by the visited policy control function network element based on the first PTI, that the execution result is the execution result of the first terminal policy; and
sending, by the visited policy control function network element, a second message to the home policy control function network element, wherein the second message comprises the execution result and the second PTI and the second PTI.

18. The method according to claim 17, wherein the second PTI is a PTI allocated by the home policy control function network element for the first terminal policy.

19. The method according to claim 17, wherein the determining, by the visited policy control function network element based on the first PTI, that the execution result is the execution result of the first terminal policy comprises:
   if the visited policy control function network element determines that the first PTI is a PTI allocated by the visited policy control function network element for the first terminal policy, determining, by the visited policy control function network element, that the execution result is the execution result of the first terminal policy.

20. The method according to claim 17, wherein the method further comprises:
   when the visited policy control function network element sends the first terminal policy and the first PTI to the mobility management network element, sending, by the visited policy control function network element to the mobility management network element, a second terminal policy formulated by the visited policy control function network element.

21. The method according to claim 17, wherein the receiving, by the visited policy control function network element, an execution result of the first terminal policy from the mobility management network element comprises:
   receiving, by the visited policy control function network element, a manage terminal policy complete message from the mobility management network element, wherein the execution result is an execution success result of the first terminal policy; or
   receiving, by the visited policy control function network element a manage terminal policy command reject message from the mobility management network element, and the manage terminal policy command reject message comprises an execution failure result of the first terminal policy, the execution result is the execution failure result of the first terminal policy; or
   receiving, by the visited policy control function network element a manage terminal policy command reject message from the mobility management network element, and the manage terminal policy command reject message does not comprise an execution failure result of the first terminal policy, the execution result is an execution success result of the first terminal policy.

* * * * *

UNITED STATES PATENT AND TRADEMARK OFFICE
CERTIFICATE OF CORRECTION

PATENT NO. : 11,310,650 B2
APPLICATION NO. : 17/014581
DATED : April 19, 2022
INVENTOR(S) : Xiaoyun Zhou Page 1 of 1

It is certified that error appears in the above-identified patent and that said Letters Patent is hereby corrected as shown below:

In the Claims

In Column 28 Line 66-67 In Claim 17, delete "and the second PTI and the second PTI." and insert -- and the second PTI. --.

In Column 29 Line 23 (approx.) In Claim 21, delete "receiving ," and insert -- receiving, --.

Signed and Sealed this
Eighteenth Day of October, 2022

*Katherine Kelly Vidal*
Katherine Kelly Vidal
*Director of the United States Patent and Trademark Office*